July 23, 1935.
C. R. WASEIGE
2,009,154
PACKING MEANS FOR BEARINGS
Filed March 21, 1932
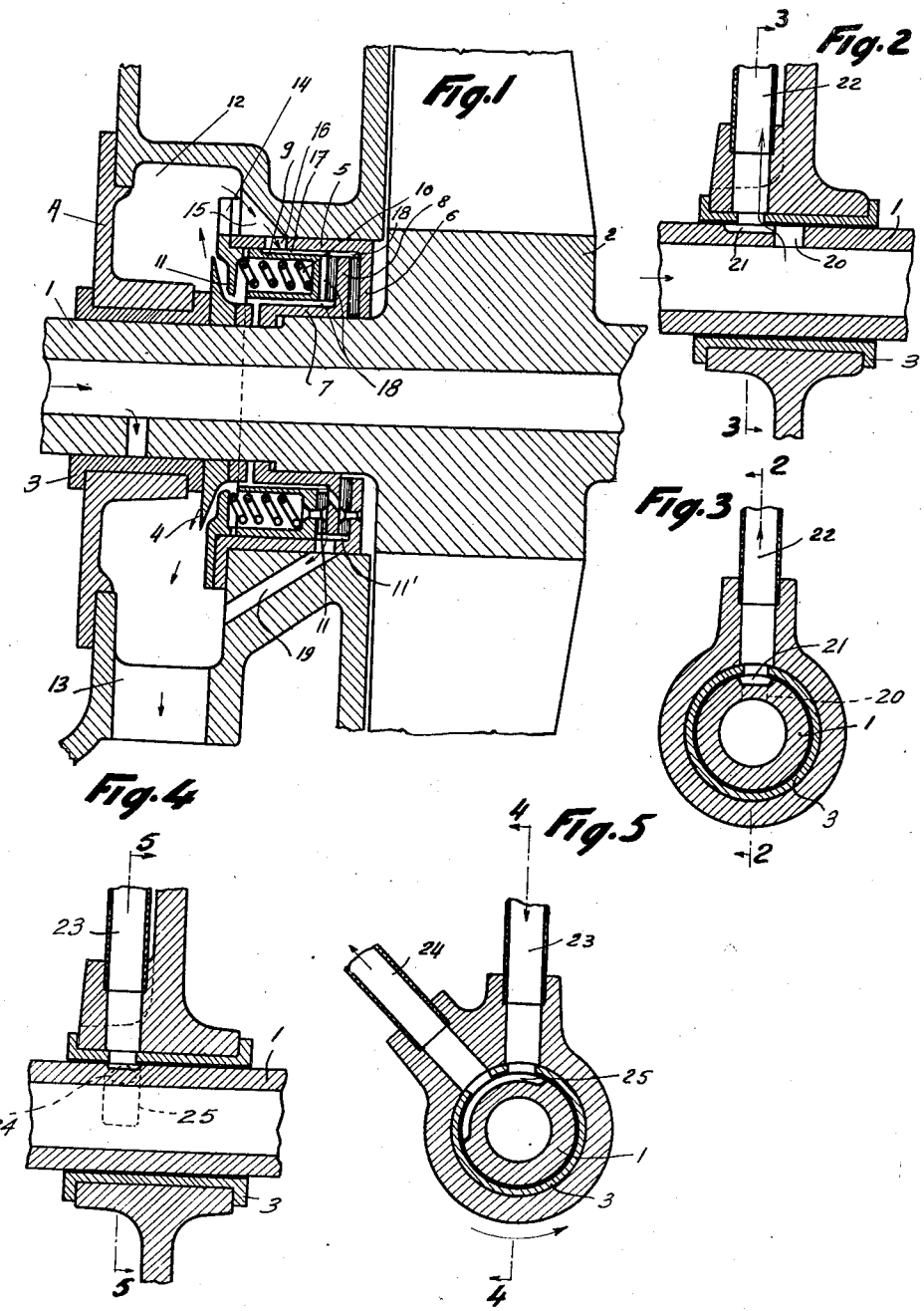
INVENTOR
Charles Raymond Waseige
Warren T. Hunt
ATTORNEY.

Patented July 23, 1935

2,009,154

UNITED STATES PATENT OFFICE 2,009,154

PACKING MEANS FOR BEARINGS

Charles Raymond Waseige, Rueil-Malmaison (Seine-et-Oise), France, assignor, by mesne assignments, to Eclipse Aviation Corporation, East Orange, N. J., a corporation of New Jersey Application March 21, 1932, Serial No. 600,323
In France May 8, 1931

6 Claims. (Cl. 286—7)

This invention relates to a bearing adapted to be subjected to differential pressures, but more particularly to a bearing to be utilized in conjunction with centrifugal compressors, particularly compressors of the kind which are employed for supercharging of airplane motors. Compressors of the above described nature turn at speeds attaining 20,000 or 30,000 R. P. M. necessitating copious lubrication of the bearings. It is important, however, that this lubrication should not penetrate into the compressor and be delivered therefrom to the carburator, which would result in faulty carburation.

In the case of compressors operating upon air at atmospheric pressure, the lubricant has a tendency to follow the lubricated elements and enter the compressor by reason of the low pressure that exists at the center of the rotor and in case of a compressor fed by air previously compressed, the excess pressure at the center of the rotor has a tendency to force from the lubricated parts, particularly the shaft, a certain quantity of lubricant, resulting in insufficient lubrication.

The object of the present invention is to overcome these difficulties by the provision of a stuffed or packed joint between the rotor and the bearing which supports the rotor shaft. Besides, a lubricant deflector is provided on the shaft between the rotor and the last mentioned bearing and rotates within a chamber designed to collect lubricant thrown off thereby. Provision is made for conducting a small portion of deflected oil from the chamber to the inside of the packings and for withdrawing the remainder of the lubricant from the chamber, as well as that lubricant which, having been deposited on the inside of the packings passes therethrough, as a result of the centrifugal forces set up in the rotation of the shaft.

The invention is represented as embodied in a compressor, but I do not wish to be limited by such embodiment, since the invention is susceptible of use wherever bearings are found, which are subjected to differential pressures.

In the drawing, Fig. 1 is a sectional elevation of the invention in conjunction with a compressor rotor.

Fig. 2 is a section illustrating the shaft as a lubricant distributor.

Fig. 3 is a section at 3—3 on Figure 2.

Fig. 4 is a modification of Fig. 2.
Fig. 5 is a section at 5—5 on Fig. 4.

A shaft 1 carrying the compressor rotor 2 is journaled in a bearing 3 supported by a housing broadly designated as A.

Adjacent the compressor side of the bearing 3, there is provided a lubricant deflector 4 fixed to the shaft 1 by any means expedient.

Supported in the housing A between the housing and the shaft, there is fixed a ring 5 having a depending portion 6 closely encircling the shaft. A sleeve 7 provided with a flanged portion 8 is positioned on the shaft in such manner as to be slidable thereon, but fixed for rotation therewith. Between the ring and sleeve, and attached to the housing A is an annulus 9 capable of axial movement along the housing. A spring 10 is interposed on an annular dependence 11 and operates against the annulus to urge it, as well as the slidable sleeve 8, in the direction of the part 6 of ring 5. An annular packing is fixed on the inside face of the part 6 and likewise on the annulus, with the result that a pressure of the spring urges the two packings 11 and 11' against part 8 of the sleeve 7, thereby precluding the differential pressure existing in the rotor chamber from being exerted on the bearing of the shaft. In the rotation of the shaft, lubricant deflected by deflector 4 is thrown outwardly into a chamber 12 provided with a gravity outlet 13 and a collector 14. The collector, positioned upon the chamber walls, communicates through a passageway 15 and orifices 16 with grooves 17 provided on the exterior of the annulus 9. The grooves 17 communicate in turn with radial canals 18 which conduct the lubricant to the inside faces of the packings. A conduit 19 beneath the shaft provides a passageway from the exterior of the packings to the outlet 13.

The operation of the device is as follows:

Lubricant applied to the bearing 3 tending to advance along the shaft, is deflected during the rotation thereof by the deflector 4 and thrown into the chamber 12 from which the greatest part is evacuated by gravity. A portion, however, descending the chamber walls is collected by the collector 14 and transmitted through 15, 16 and 17 to the canals 18 in proximity to the inside of the packings. The spring within the annulus 9 operates to urge the packings as well as the ring 7 in the direction of ring 5 and provides by virtue of this pressure a tight joint between the compressor chamber and the bearing 3. Obviously, since ring 5 is fixed to the housing, and sleeve 7 is in close contact with the shaft, the passage of fluid from the compressor chamber to the neighborhood of the bearing or vice versa, must be through the packings. Lubricant delivered to the canals 18 finds its way through the packings and is withdrawn through conduit 19, after having not only lubricated the surface of the sleeve 8, but also soaked the packings, thereby making them impervious to the passage therethrough of fluid.

In Fig. 2 I have illustrated an arrangement whereby the compressor shaft functions as a distributor of lubricant for the organs of the assemblage. A hollow shaft 1 communicates through an orifice 20 and grooves 21 with a conduit 22 leading to the elements to be lubricated. The number of orifices and grooves may be varied at will, but it is obvious that in the rotation of the shaft, lubricant transmitted to its interior will be thrown outwardly by centrifugal force through the orifices 20 and grooves 21 and therefrom through conduit 22.

Fig. 4 illustrates a slightly different arrangement whereby lubricant is brought to the proximity of the shaft 1 by a conduit 23, whilst a second conduit 24 is provided for the conduction of lubricant to the parts to be oiled. A groove 25 is fashioned in the exterior of the shaft and provided with a width sufficient to permit it to communicate passages 23 and 24 in certain positions of the shaft. With this construction, lubricant is intermittently permitted to pass from conduit 23 to conduit 24 when the shaft is rotated.

Although, as before stated, I have described my invention in conjunction with a rotary air compressor, it is to be understood that the above constructions are only exemplary and may be replaced by mechanical equivalents without departing from the scope of my invention.

Having now particularly described and ascertained the nature of my said invention and in what manner the same is performed, I declare that what I claim is:

1. In a device for preventing oil seepage along a shaft rotatable in a bearing mounted in a housing, a flanged sleeve slidably mounted on the shaft adjacent the bearing, said sleeve being rotatable with the shaft and having a slight clearance therewith, a member secured to the housing having a flange closely encircling the shaft and adjacent said sleeve flange on one side thereof, an annular member on the opposite side of the flanged sleeve, spring means coacting with the housing for urging the annular member and the flanged sleeve toward the flange that is secured to the housing, an oil deflector secured to the shaft, packing means interposed between said flanges, a conduit from the housing having an opening adjacent the deflector for conducting lubricant from the housing to said packing, and a drain conduit in said flanged member for returning excess lubricant to the housing.

2. In a device for preventing oil seepage along a shaft having a bearing in a housing, a flanged sleeve slidably mounted on the shaft adjacent the bearing, said sleeve being rotatable with the shaft and having a slight clearance therewith, a member secured to the housing having a flange closely encircling the shaft adjacent said sleeve flange on one side thereof, an annular member on the opposite side of the flanged sleeve, spring means coacting with the housing for urging the annular member and the flanged sleeve toward the flange that is secured to the housing, packing means interposed between said flanges, means for introducing lubricant to said bearing, means for collecting and conducting excess lubricant from the bearing through said flanged member to said packing including an opening in the upper portion of the flanged member, and said flanged member having a drainage opening in the lower side thereof.

3. In a device for preventing oil seepage along a shaft having a bearing in a housing, a flanged sleeve slidably mounted on the shaft adjacent the bearing, said sleeve being rotatable with the shaft and having a slight clearance therewith, a flange closely encircling the shaft and secured to the housing adjacent said sleeve flange on one side thereof, an annular member on the opposite side of the flanged sleeve, spring means coacting with the housing for urging the annular member and the flanged sleeve toward the flange that is secured to the housing, packing means interposed between said flanges, means for introducing lubricant to said bearing, a deflector rotatable on said shaft arranged between said bearing and said flanged sleeve, an annular chamber in said housing surrounding said deflector, means for conducting lubricant thrown from the deflector to said packing, and means forming a return passage from said packing to said annular chamber.

4. In a device for preventing oil seepage along a shaft having a bearing in a housing, a deflector secured to the shaft arranged between the bearing and the device, a sleeve slidably secured to the shaft and rotatable therewith, said sleeve having a flange adjacent the device, a second sleeve secured to the housing having an inturned flange closely encircling said shaft and arranged adjacent the first sleeve flange, an annular member interposed between said sleeves having a face arranged adjacent the first sleeve flange, a spring urging the annular member toward the flanges to clamp the first sleeve flange against the second sleeve flange, means forming a longitudinally extending passage between the second sleeve and the annular member having communication with both sides of said first sleeve flange, means for conducting lubricant by gravity to said passage, and means forming a return lubricant passage from said first mentioned passage to said housing.

5. In a device for preventing oil seepage along a shaft having a bearing in a housing, a deflector secured to the shaft arranged between the bearing and the device, a sleeve slidably secured to the shaft and rotatable therewith, said sleeve having a flange adjacent the device, a second sleeve secured to the housing having an inturned flange closely encircling said shaft and arranged adjacent the first sleeve flange, an annular member interposed between said sleeves having a face arranged adjacent the first sleeve flange, a spring urging the annular member toward the flanges to clamp the first sleeve flange against the second sleeve, said annular member having a longitudinally extending groove on its outer surface in communication with both sides of said first sleeve flange, a collector for receiving lubricant thrown from said deflector, means for conducting lubricant by gravity from the collector to said groove, and a passage for returning lubricant from said flanges to said housing.

6. In a device for preventing oil seepage along a shaft having a bearing in a housing, a sleeve slidably secured to the shaft, a deflector secured to the shaft, said sleeve having a flange at the end thereof that is remote from the deflector, packing means between the flange and the housing, a conduit having an opening in the housing adjacent the deflector for leading lubricant to the packing, and means for returning excess lubricant from the packing to the chamber.

CHARLES RAYMOND WASEIGE.